(12) United States Patent
Hillier et al.

(10) Patent No.: US 8,262,770 B2
(45) Date of Patent: Sep. 11, 2012

(54) PROCESS FOR CONTROLLING ACID IN SULFIDE PRESSURE OXIDATION PROCESSES

(75) Inventors: Daniel Hillier, Oakville (CA); Yeonuk Choi, Oakville (CA); Noelene Ahern, Burnaby (CA)

(73) Assignee: Barrick Gold Corporation, Toronto (CA)

( * ) Notice: Subject to any disclaimer, the term of this patent is extended or adjusted under 35 U.S.C. 154(b) by 509 days.

(21) Appl. No.: 12/209,939

(22) Filed: Sep. 12, 2008

(65) Prior Publication Data
US 2009/0071296 A1    Mar. 19, 2009

Related U.S. Application Data

(60) Provisional application No. 60/973,364, filed on Sep. 18, 2007, provisional application No. 60/026,364, filed on Feb. 5, 2008.

(51) Int. Cl.
*C22B 11/00* (2006.01)
(52) U.S. Cl. ............................................. 75/744; 75/711
(58) Field of Classification Search .................... 75/744, 75/711
See application file for complete search history.

(56) References Cited

U.S. PATENT DOCUMENTS

| | | | |
|---|---|---|---|
| 3,799,334 A | 3/1974 | Collins | |
| 3,819,363 A | 6/1974 | Wanzenberg | |
| 3,968,032 A | 7/1976 | Menendez et al. | |
| 4,058,897 A | 11/1977 | Edwards | |
| 4,138,248 A | 2/1979 | Narain | |
| 4,177,068 A | 12/1979 | Balakrishnan et al. | |
| 4,270,609 A | 6/1981 | Choules | |
| 4,314,890 A | 2/1982 | Beck et al. | |
| 4,337,226 A | 6/1982 | Peasley et al. | |
| 4,397,686 A | 8/1983 | Winkler et al. | |
| 4,423,011 A | 12/1983 | Baglin et al. | |
| 4,566,772 A | 1/1986 | Sulesky et al. | |
| 4,786,323 A | 11/1988 | Gock et al. | |
| 4,867,868 A | 9/1989 | Miller et al. | |
| 4,911,804 A | 3/1990 | Dickson | |
| 4,925,923 A | 5/1990 | Yalpani et al. | |
| 4,986,360 A | 1/1991 | Laky et al. | |
| 4,994,243 A | 2/1991 | Goldstone et al. | |
| 5,034,055 A | 7/1991 | Rowson | |
| 5,071,477 A * | 12/1991 | Thomas et al. ................. | 75/744 |
| 5,078,977 A | 1/1992 | Mudder et al. | |
| 5,087,269 A | 2/1992 | Cha et al. | |
| 5,254,153 A | 10/1993 | Mudder | |
| 5,262,048 A | 11/1993 | Zimmerman et al. | |

(Continued)

FOREIGN PATENT DOCUMENTS

CA    2070087    12/1992

(Continued)

OTHER PUBLICATIONS

Author Unknown, "Positive Results for Initial Metallurgical Testwork from the Akanani Platinum Project", Press Release—AfriOre Limited, Jun. 28, 2006, pp. 1-2.

(Continued)

*Primary Examiner* — Jie Yang
(74) *Attorney, Agent, or Firm* — Sheridan Ross P.C.

(57) ABSTRACT

The present invention is directed to flotation of refractory gold sulfide ores and to pressure oxidized residue neutralization using flotation tailings that have been contacted with an off gas of pressure oxidation.

20 Claims, 7 Drawing Sheets

U.S. PATENT DOCUMENTS

| | | | |
|---|---|---|---|
| 5,364,605 A | 11/1994 | Pfeffer et al. | |
| 5,411,575 A | 5/1995 | Fleming et al. | |
| 5,423,991 A | 6/1995 | Zimmerman et al. | |
| 5,629,137 A | 5/1997 | Leedy | |
| 5,654,127 A | 8/1997 | Leedy | |
| 5,654,204 A | 8/1997 | Anderson | |
| 5,675,060 A | 10/1997 | Benoist et al. | |
| 5,725,995 A | 3/1998 | Leedy | |
| 5,743,936 A | 4/1998 | Yokoyama et al. | |
| 5,753,104 A | 5/1998 | Hoecker et al. | |
| 5,834,294 A | 11/1998 | Brierley et al. | |
| 5,834,838 A | 11/1998 | Anderson | |
| 5,837,210 A | 11/1998 | Simmons et al. | |
| 5,851,499 A | 12/1998 | Gathje et al. | |
| 5,909,022 A | 6/1999 | Bourke et al. | |
| 5,939,034 A | 8/1999 | Virnig et al. | |
| 5,968,364 A | 10/1999 | Virnig et al. | |
| 5,985,221 A | 11/1999 | Knecht | |
| 6,011,404 A | 1/2000 | Ma et al. | |
| 6,041,941 A | 3/2000 | Newell et al. | |
| 6,092,666 A | 7/2000 | Clark et al. | |
| 6,131,835 A | 10/2000 | Johnson | |
| 6,131,836 A | 10/2000 | Johnson | |
| 6,197,214 B1 | 3/2001 | Virnig et al. | |
| 6,200,545 B1 | 3/2001 | Dreisinger | |
| 6,210,648 B1 | 4/2001 | Gathje et al. | |
| 6,251,163 B1* | 6/2001 | King | 75/744 |
| 6,260,549 B1 | 7/2001 | Sosiak | |
| 6,310,034 B1 | 10/2001 | Woychik et al. | |
| 6,318,361 B1 | 11/2001 | Sosiak | |
| 6,325,062 B1 | 12/2001 | Sosiak | |
| 6,383,458 B1 | 5/2002 | Brierley et al. | |
| 6,414,509 B1 | 7/2002 | Bhatt et al. | |
| 6,425,392 B1 | 7/2002 | Sosiak | |
| 6,471,743 B1 | 10/2002 | Young et al. | |
| 6,482,373 B1 | 11/2002 | Hannaford et al. | |
| 6,537,747 B1 | 3/2003 | Mills, Jr. et al. | |
| 6,574,130 B2 | 6/2003 | Segal et al. | |
| 6,613,271 B1 | 9/2003 | Lewis-Gray | |
| 6,641,642 B2 | 11/2003 | Simmons et al. | |
| 6,643,165 B2 | 11/2003 | Segal et al. | |
| 6,647,250 B1 | 11/2003 | Bultman et al. | |
| 6,660,059 B2 | 12/2003 | Ji et al. | |
| 6,676,909 B2 | 1/2004 | Marsden et al. | |
| 6,679,383 B2 | 1/2004 | Gathje et al. | |
| 6,696,283 B1 | 2/2004 | Brierley et al. | |
| 6,706,402 B2 | 3/2004 | Rueckes et al. | |
| 6,784,028 B2 | 8/2004 | Rueckes et al. | |
| 6,828,351 B2 | 12/2004 | Epstein et al. | |
| 6,835,591 B2 | 12/2004 | Rueckes et al. | |
| 6,836,424 B2 | 12/2004 | Segal et al. | |
| 6,846,841 B2 | 1/2005 | Hunter et al. | |
| 6,896,808 B1 | 5/2005 | Jay | |
| 6,911,682 B2 | 6/2005 | Rueckes et al. | |
| 6,919,592 B2 | 7/2005 | Segal et al. | |
| 6,942,921 B2 | 9/2005 | Rueckes et al. | |
| 6,953,120 B2 | 10/2005 | Deveau et al. | |
| 6,979,590 B2 | 12/2005 | Rueckes et al. | |
| 7,018,951 B2 | 3/2006 | Gaffney et al. | |
| 7,049,466 B2 | 5/2006 | Bogan, Jr. et al. | |
| 7,053,022 B2 | 5/2006 | Gaffney et al. | |
| 7,056,758 B2 | 6/2006 | Segal et al. | |
| 7,066,983 B2 | 6/2006 | Ji et al. | |
| 7,087,231 B2 | 8/2006 | Guerin-Marchand et al. | |
| 7,087,797 B2 | 8/2006 | Sielcken et al. | |
| 7,120,047 B2 | 10/2006 | Segal et al. | |
| 7,176,505 B2 | 2/2007 | Rueckes et al. | |
| 7,219,804 B2 | 5/2007 | Simmons et al. | |
| 7,229,560 B2 | 6/2007 | Rink et al. | |
| 7,244,769 B2 | 7/2007 | Epstein et al. | |
| 7,341,700 B2 | 3/2008 | Marsden et al. | |
| 7,488,370 B2 | 2/2009 | Hourn et al. | |
| 2003/0075021 A1 | 4/2003 | Young et al. | |
| 2003/0104400 A1 | 6/2003 | Ruben et al. | |
| 2006/0133974 A1 | 6/2006 | Ji et al. | |
| 2006/0142634 A1 | 6/2006 | Anstadt et al. | |
| 2006/0234260 A1 | 10/2006 | Griffais et al. | |
| 2009/0071295 A1 | 3/2009 | Gorain et al. | |
| 2009/0074607 A1 | 3/2009 | Hillier et al. | |

FOREIGN PATENT DOCUMENTS

| | | |
|---|---|---|
| CA | 2095307 | 4/1993 |
| CA | 2129819 | 8/1993 |
| CA | 2138618 | 7/1995 |
| CA | 2264865 | 4/1998 |
| CA | 2321703 | 9/1999 |
| CA | 2349940 | 3/2000 |
| CA | 2363031 | 8/2000 |
| CA | 2278043 | 1/2001 |
| CA | 2278044 | 1/2001 |
| CA | 2417417 | 1/2002 |
| CA | 2504934 | 5/2004 |
| CA | 2272037 | 7/2009 |
| CN | 86101940 | 4/1987 |
| CN | 1052903 | 7/1991 |
| CN | 1253845 | 5/2000 |
| CN | 2405636 | 11/2000 |
| CN | 1544169 | 11/2004 |
| CN | 1800421 | 7/2006 |
| CN | 1800423 | 7/2006 |
| DE | 3036848 | 4/1982 |
| EP | 0614089 | 9/1994 |
| EP | 0686206 | 5/1995 |
| EP | 1441048 | 7/2004 |
| GR | 1001483 | 2/1994 |
| KR | 2050046 | 6/2002 |
| KR | 2077054 | 10/2002 |
| KR | 20030041841 | 5/2003 |
| KR | 5002690 | 1/2005 |
| MX | 3000745 | 11/2004 |
| NZ | 506858 | 9/2002 |
| RU | 2104321 | 2/1998 |
| RU | 2135297 | 8/1999 |
| TW | 528732 | 4/2003 |
| WO | WO 95/12001 | 5/1995 |
| WO | WO 95/32285 | 11/1995 |
| WO | WO 99/47714 | 9/1999 |
| WO | WO 00/48944 | 8/2000 |
| WO | WO 00/65112 | 11/2000 |
| WO | WO 01/69862 | 9/2001 |
| WO | WO 02/08475 | 1/2002 |
| WO | WO 2004/042094 | 5/2004 |
| WO | WO 2004/067751 | 8/2004 |
| WO | WO 2004/069166 | 8/2004 |

OTHER PUBLICATIONS

Bourke, "Flash Flotation of Copper and Gold", Microsoft PowerPoint—OutputV3 international, Issue 3, Sep. 2002, pp. 7-11, available at ttp://64.233.167.104/search?q=cache:qRzNN7-cECcJ:www.outec.com/files/Technology/Documents/newsletters/Output3_int..., printed on Aug. 18, 2007.

"DEPRAMIN® in Flotation", available at http://www.cs.akzonobel.com/Products/Depramin/inFlotation/, as early as Nov. 15, 2004, p. 1, printed on Aug. 18, 2007.

King, "Audit the Hidden Costs of Inefficient Thickness", Microsoft PowerPoint—OutputV3 international, Issue 3, Sep. 2002, pp. 12-17, available at ttp://64.233.167.104/search?q=cache:qRzNN7-cECcJ:www.outec.com/files/Technology/Documents/newsletters/Output3_int..., printed on Aug. 18, 2007.

Okley, "Collaborative Research: how should it sharpen your own competitive edge?", Microsoft PowerPoint—OutputV3 international, Issue 3, Sep. 2002, pp. 1-6, available at http://64.233.167.104/search?q=cache:qRzNN7-cECcJ:www.outec.com/files/Technology/Documents/newsletters/Output3_int..., printed on Aug. 18, 2007.

Yan, et al., "Predicting the Performance of a Flotation Circuit that Incorporates Flash Flotation", Conference Proceeding—Centenary of Flotation Symposium, 2005, available at http://www.shop.ausimm.com.au/paperdetails.php?PaperID=1914, pp. 1-2, printed on Aug. 18, 2007 (Abstract Only).

Wills, Mineral Processing Technology: An Introduction to the Practical Aspects of Ore Treatment and Mineral Recovery, 1979, vol. 29, Chapter 12, pp. 276-337.

Pyke, B.L. et al., "The Characterisation and Behavior of Carbonaceous Material in a Refractory Gold Bearing Ore," Minerals Engineering, 1999, vol. 12, No. 8., pp. 851-862.

"Blue Ridge Platinum Concentrator handed over," Bateman Globe 78, 4th Quarter, 2009, pp. 6-7.

* cited by examiner

PROCESS FOR CONTROLLING ACID IN SULFIDE PRESSURE OXIDATION PROCESSES

CROSS REFERENCE TO RELATED APPLICATION

Cross reference is made to U.S. patent application Ser. No. 60/973,364, filed Sep. 18, 2007, and U.S. patent application Ser. No. 61/026,364, filed Feb. 5, 2008, both of which are entitled "PROCESS FOR MERCURY CONTROL DURING PRESSURE OXIDATION" and each of which is incorporated herein by this reference in its entirety.

FIELD OF THE INVENTION

The inventions herein relate generally to recovery of precious metals from refractory materials and particularly to recovery of precious metals from refractory sulfide and/or preg robbing ores, concentrates, and tailings.

BACKGROUND OF THE INVENTION

Gold ores are treated by a variety of processes. All hydrometallurgical gold recovery processes rely on leaching relatively low concentrations of gold from ores using lixiviants, primarily cyanide solutions. Ores that contain gold extracted by comminuting and followed by leaching with cyanide solution are known as "oxide" or "free milling" ores. However, gold recovery from most ores by cyanide leaching is not effective, with as little as 30 percent, or even lower, of the gold content of the ore being amenable to cyanide leaching. These ores are commonly termed "refractory" ores. Poor gold recovery from refractory ores is typically caused by the gold being occluded in sulfide mineral grains (usually arsenopyrite and/or pyrite grains) so that the gold cannot react with the cyanide leach solution or by dissolved gold being adsorbed by carbonaceous material present in the ore (this phenomenon is known as "preg robbing") Ores having both types of metallurgical problems (occluded and preg robbing) are commonly known as "double refractory" ores. Further losses in gold recovery can occur when dissolved gold is occluded by inorganic precipitates which typically occur during autoclave treatment of refractory gold ores.

A common method of treating refractory gold ores is by pressure oxidation in autoclaves. Pressure oxidation oxidizes sulfide minerals, rendering the residue non-refractory. The gold is then dissolved by cyanidation and concentrated by adsorption onto activated carbon (either in adsorption columns or in carbon added to the leaching process (known as Carbon-In-Leach ("CIL") or Carbon-In-Pulp ("CIP") techniques) or onto a resin (known as the Resin-In-Pulp ("RIP") technique). The adsorbed gold is eluted from the adsorbed carbon by washing and stripping with ammonia, nitric acid, hydrochloric acid, caustic solution, and/or steam. The gold is then converted to a solid from the eluate by electrowinning (electroplating of gold onto cathodes), precipitation and filtration, or cementation.

Prior to precious metal recovery, the autoclave discharge is either directly neutralized after cooling or subjected to a solid/liquid separation to remove acid and dissolved metals. If either cyanidation or thiosulphate is employed, the pH of the pulp must be increased to an alkaline pH to avoid the formation of hydrogen cyanide or cause thiosulphate destruction.

Pressure oxidation converts sulfide sulfur in minerals such as pyrite $FeS_2$ and arsenopyrite $FeAsS$, into sulfate sulfur. Small amounts of iron and arsenic in the sulfide materials are also converted to the dissolved ferrous iron, ferric iron, arsenite and arsenate. Under these conditions, iron is precipitated in the autoclave as goethite, hematite ($Fe_2O_3$) and scorodite ($FeAsO_4.2H_2O$), and sulfuric acid is generated in solution. These two iron compounds are very desirable because they are chemically stable. It is possible to form other stable Fe—As compounds in the autoclave, depending on the temperature, the Fe/As ratio, and the acidity in the autoclave liquor. Because of their chemical stability, these compounds are inert during the subsequent neutralization and cyanidation steps and, therefore, do not consume expensive chemicals, such as lime.

Depending on the chemical conditions prevailing in the autoclave, other less desirable iron compounds can be formed. Examples of such compounds include basic iron sulphate, $FeOHSO_4$, and jarosite, $X Fe_3(SO_4)_2(OH)_6$, where X is typically one of $H_3O^+$, $Na^+$, $K^+$, $NH_4^{30}$, $½Pb^{2+}$, and $Ag^+$.

Jarosites and basic iron sulphates can be chemically instable. For example, in the autoclave discharge, basic iron sulphate can react with lime during pre-cyanidation neutralization to form ferric hydroxide and calcium sulphate:

$$FeOHSO_4 + Ca(OH)_2 + 2H_2O = Fe(OH)_3 + CaSO_4.2H_2O \qquad (1)$$

Also, some jarosites, particularly hydronium jarosite, react with lime during pre-cyanidation neutralization, to form ferric hydroxide and calcium sulphate:

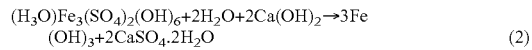

$$(H_3O)Fe_3(SO_4)_2(OH)_6 + 2H_2O + 2Ca(OH)_2 \rightarrow 3Fe(OH)_3 + 2CaSO_4.2H_2O \qquad (2)$$

The presence and relative quantities of hematite, basic ferric sulphate, ferric arsenate and various forms of jarosite can have a major impact on the method and economics of subsequent processes, and largely depends upon the nature of the starting material and the acidic pressure oxidation leach conditions. Generally, pressure oxidation under high acid conditions favours basic iron sulphate and possibly jarosite formation while low acid conditions favour hematite formation. When pressure oxidation is operated under conditions which favour hematite formation, the feed's sulfide sulphur content is converted to free sulphuric acid and dissolved metal sulphates in the solution phase (such as dissolved ferric sulphate), and, if calcium is present, as chemically stable and inert calcium sulphate in the solid phase. Neutralization of the free acid and dissolved sulphate salts in this type of autoclave discharge can be achieved inexpensively with limestone ($CaCO_3$), which is usually a very cost-effective reagent. In some circumstances, where access to, or availability of a suitable limestone deposit, is not possible, even the cost of limestone can be prohibitively expensive. When the autoclave is operated under conditions that favour the formation of residues rich in basic iron sulphate and jarosite, it can have a significant negative economic impact on subsequent precious metal recovery operations. Adequate neutralization of basic iron sulphate and/or jarosite can be accomplished only with stronger and more expensive neutralization agents, such as lime, $CaO$, or sodium hydroxide, $NaOH$.

U.S. Patent Application 2006/0133974, published Jun. 22, 2006, and entitled "Reduction of Lime Consumption When Treating Refractory Gold Ores or Concentrates" teaches the use of a hot curing process, as an effective method, prior to gold leaching, for reducing the cost of neutralizing acid residues from pressure oxidation. In this process, basic iron sulphate and free sulphuric acid, both contained in the autoclave discharge, react to form dissolved ferric sulphate according to the following equation:

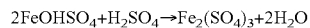

$$2FeOHSO_4 + H_2SO_4 \rightarrow Fe_2(SO_4)_3 + 2H_2O \qquad 3)$$

This hot curing process has a residence time of 1 to 24 hours and a preferred temperature range of 85° C. to 95° C. Because the ferric sulphate-containing solution can be separated by solid/liquid separation techniques from the precious metal-containing residue, allowing time for basic iron sulphate to convert to dissolved ferric sulphate can reduce the consumption of expensive lime in the neutralization reaction of cyanidation feed in favor of inexpensive limestone. A further benefit of allowing time for the various components of the autoclave discharge to react with one another is that the strong ferric sulphate solution produced can be recovered and recycled to pre-treat the feed to the autoclave. Ferric ions in the recycled solution react with and oxidize sulfides in the autoclave feed material, thereby reducing the requirement and associated expense of oxygen in the autoclave process. In addition, any remaining acid in the recycle solution will react with carbonate minerals, when present in the autoclave feed material, and reduce the subsequent formation of carbon dioxide inside the autoclave and further improve the utilization of oxygen.

While the hot curing process is well suited to the treatment of pressure oxidation residues containing gold and can, relative to conventional pressure oxidation processes, reduce the costs of neutralizing pressure oxidation residues, there remains a need to realize further reduction in residue neutralization costs. Lime consumption remains a major contributor to these costs.

SUMMARY OF THE INVENTION

These and other needs are addressed by the various embodiments and configurations of the present invention. The present invention is directed to the use of flotation tailings, containing acid consumers, to neutralize reactive sulfates produced by pressure oxidation.

In one embodiment, a method is provided that includes the steps:

(a) providing a precious metal-bearing material including acid consumers;

(b) floating the material to form a concentrate including most of the precious metal and tailings including a part of the acid consumers in the material;

(c) pressure oxidizing the concentrate to form a pressure oxidized slurry including pressure oxidized residue, acid, and ferric sulfates and other reactive sulfates and an off gas, the pressure oxidized residue including most of the precious metal in the feed material;

(d) contacting the off gas with the tailings to cool the off gas and heat the tailings;

(h) contacting the heated tailings with the liquid component of the pressure oxidized slurry to neutralize, at least partially, liquid-phase reactive sulfates;

(i) contacting the solid component of the pressure oxidized slurry with an alkaline lixiviant (e.g., cyanide) to dissolve most of a selected precious metal (e.g., gold) in a pregnant leach solution; and (j) thereafter recovering the selected precious metal from the pregnant leach solution.

Neutralization of the pressure oxidized residue can be performed by any suitable techniques and in any suitable vessel(s). In one configuration, neutralization is performed in a decantation circuit. The heated flotation tailings are contacted with the pressure oxidized slurry in an upstream decantation unit to consume less stable reactive sulfates and the partially neutralized slurry is then contacted with limestone and/or lime in a downstream unit to consume any remaining reactive sulfates.

Using heated flotation tailings can reduce lime and/or limestone consumption substantially when compared to conventional pressure oxidation processes. The amount of limestone and/or lime required to yield a selected pH in the absence of heating a selected amount of tailings is normally significantly greater than an amount of limestone and/or lime required to yield the selected pH when the selected amount of tailings is heated.

These and other advantages will be apparent from the disclosure of the invention(s) contained herein.

"Acid consumer" refers to any material that reacts with sulfuric acid to form a new compound. Exemplary classes of acid consumers include carbonates, oxides and hydroxides of metals. Acid consumers are commonly compounded with sodium, potassium, magnesium, and calcium. Specific examples of acid consumers include carbonates, such as limestone, soda ash, trona, ankerite, dolomite, and calcite; alkaline earth metal oxides such as lime; other metal oxides such as zinc oxide and magnesium oxide; alkali metal hydroxides such as sodium hydroxide and potassium hydroxide; other metal hydroxides such as ferric hydroxide (e.g., limonite and goethite) and aluminum hydroxides such as laterite, gibbsite, and diaspore; ammonia; and various clays.

As used herein, "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "carbonaceous" refers to organic carbon-containing. Examples of organic carbonaceous materials include humic acid, hydrocarbons, and activated carbon.

As used herein, "inorganic carbon" refers to binary compounds of carbon such as carbon oxides, carbides, carbon disulfides, etc., ternary compounds, such as metallic cyanides, metallic carbonyls, phosgenes, carbonyl sulfides, etc., and the metallic carbonates, such as calcium carbonate and sodium carbonate.

As used herein, "liquid-phase reactive sulfate" refers to a liquid-phase metal sulfate that is reactive with an acid consumer and specifically includes ferric sulfate.

As used herein, "precious metal" refers to gold and silver and the platinum group metals (i.e., ruthenium, rhodium, palladium, osmium, iridium, and platinum), with gold and silver being more preferred, and gold even more preferred.

As used herein, "reactive sulfates" refer to liquid-phase and solid-phase reactive sulfates.

As used herein, "solid-phase reactive sulfate" refers to a solid-phase metal sulfate that is reactive with an acid consumer, such as lime, and specifically includes basic iron sulfate and jarosite.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the

DETAILED DESCRIPTION

The present invention can provide a precious metal recovery process that is particularly applicable to refractory and double refractory precious metal-bearing materials.

Figure 1A:
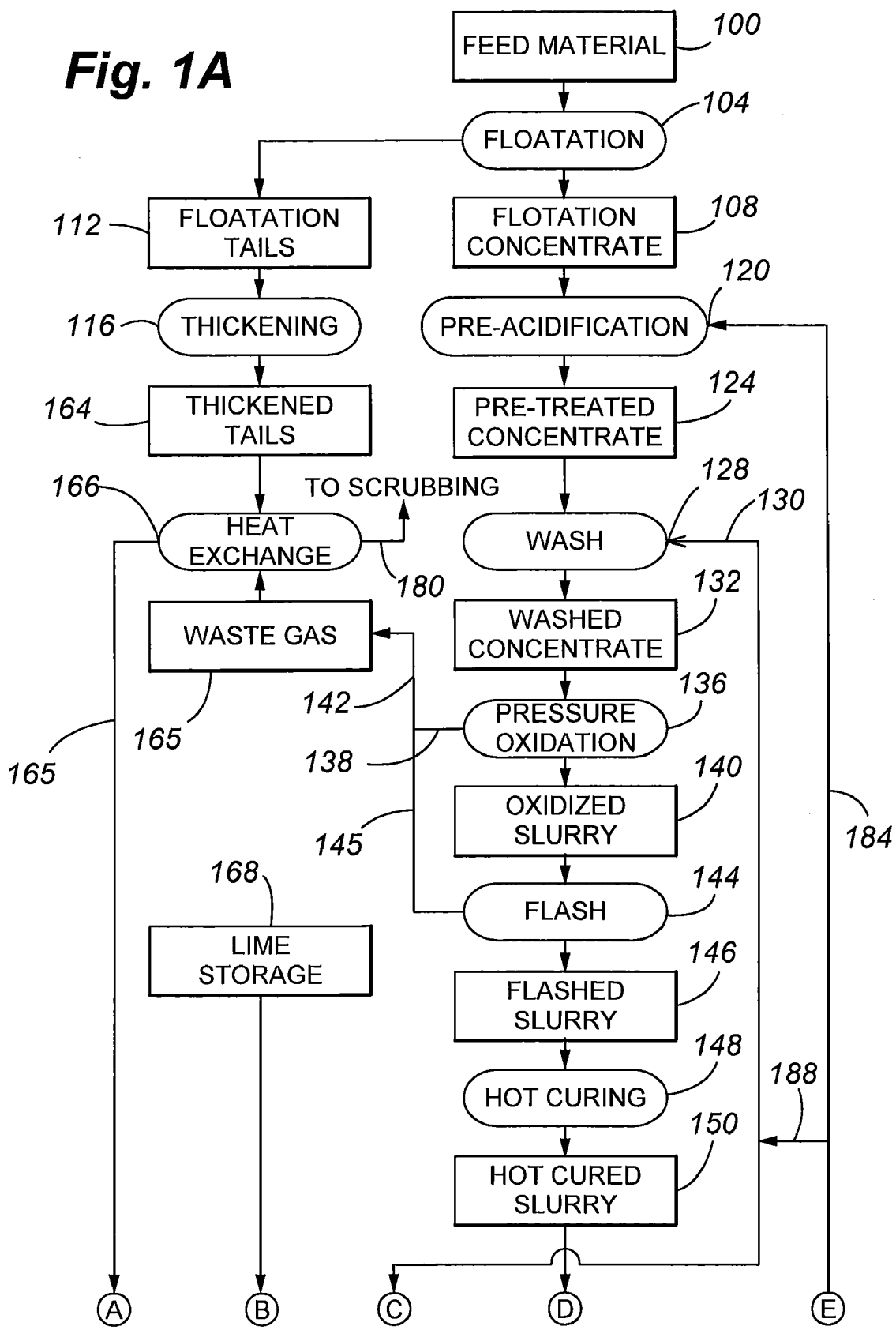
FIGS. 1A and 1B are flowcharts of a precious metal recovery process according to an embodiment of the present invention.
Figure 1B:
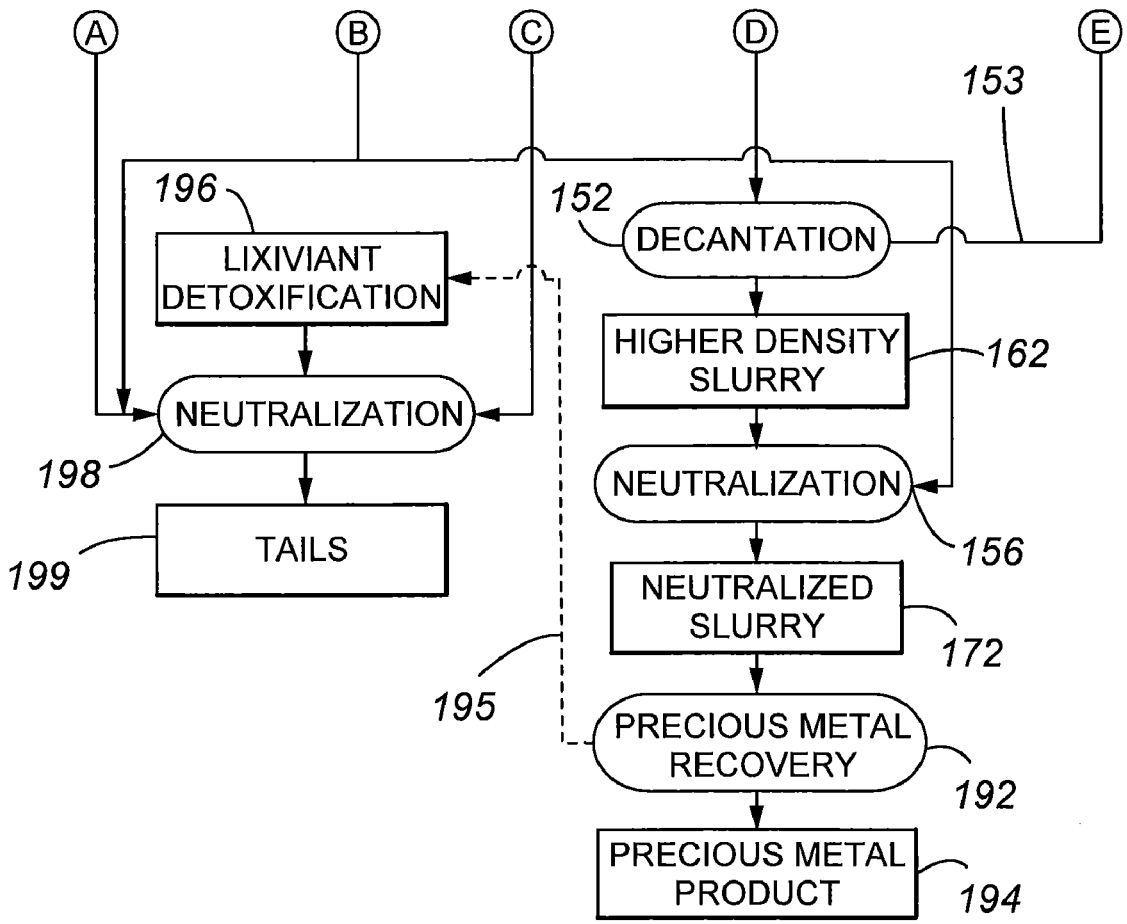

Referring to FIG. 1A, the feed material 100 is a mineralized precious metal-bearing material, such as ore, concentrate, tailings, matte, slag, and calcine. The feed material 100 includes at least about 0.1 wt. % sulfide sulfur and even more preferably from about 0.5 to about 15 wt. % sulfide sulfur, at least about 0.05 oz/tonne and even more commonly from about 0.2 to about 2.0 oz/tonne gold and at least about 1 oz/tonne and even more commonly from about 1 to about 5 oz/tonne silver. Sulfide minerals in the feed material 100 commonly include pyrite, marcasite, arsenopyrite, and chalcopyrite. The feed material 100 commonly has no more than about 1.0 oz/tonne and even more commonly no more than about 0.1 oz/tonne platinum group metals.

The feed material 100 can further include acid consumers, such as inorganic carbon-containing materials (e.g., the carbonates ankerite, calcite, siderite, and dolomite) and organic carbonaceous materials (e.g., humic acid, hydrocarbons, and activated carbon). Organic carbonaceous materials are frequently preg robbing. Generally, the amount of organic carbonaceous material is determined as the total amount of carbon in the material 100, except that which is present as inorganic carbon. Typically, the material 100 includes from about 0.1 to about 30 wt. % inorganic carbon and from about 0.3 to about 10 wt. % organic carbonaceous materials.

The feed material 100 preferably has a size distribution to liberate the precious metal-containing minerals for flotation. Preferably, the material has a $P_{80}$ size of the feed material to primary rougher flotation ranging from about 25 to about 200 microns and even more preferably from about 50 to about 175 microns.

The feed material 100 is floated (step 104) in a suitable flotation circuit to produce flotation tails 112 and concentrate 108. The flotation circuit preferably includes primary and secondary rougher flotation and, optionally, one or more of scavenger flotation, scavenger cleaner flotation, and flash flotation. Flotation is preferably performed under conditions to direct most of the TCM and acid consumers in the feed material 100 into the tails 112 and most of the sulfide minerals and precious metals into the concentrate 108. The flotation conditions to achieve these results will be appreciated by one of skill in the art. Reagents to effect this separation commonly include a carbon depressant, sulfide activator, collector and frother.

The concentrate 104 is thickened, as needed, to provide a density ranging from about 20 to about 60 vol. % solids, and the flotation tails is thickened (step 116) to provide a density ranging from about 40 to about 55 vol. % solids. Suitable flocculants may be used during the thickening operations.

In step 120, the (thickened) concentrate is contacted with sulfuric acid and/or recycled process generated acid, in a pre-acidification tank (not shown) to provide a desired pH and initiate sulfide sulfur oxidation. Preferably, the pH after pre-acidification ranges from about pH 0.5 to about pH 2.5.

The pre-treated concentrate 124 is next processed by a wash circuit 128 to remove dissolved chlorides and other halides and form a washed concentrate 132. The wash circuit 128 preferably includes a number of Counter Current Wash (CCW) units.

The washed concentrate 132, which typically has a density of from about 40 to about 55 wt. % solids, proceeds to pressure oxidation 136 in an autoclave (not shown) to produce a pressure oxidized slurry 140, containing the concentrate, and off gas 138. In pressure oxidation, the sulfide sulfur is converted into sulfate sulfur primarily by one or more of the following reactions:

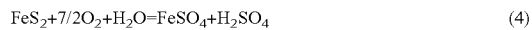

$$FeS_2 + 7/2 O_2 + H_2O = FeSO_4 + H_2SO_4 \quad (4)$$

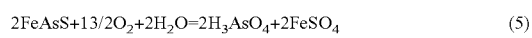

$$2FeAsS + 13/2 O_2 + 2H_2O = 2H_3AsO_4 + 2FeSO_4 \quad (5)$$

$$FeAsS + 5O_2 + 2H_2O = FeAsO_4 + 2H_2SO_4 \quad (6)$$

Under the preferred operating conditions of the autoclave most, and even more preferably at least about 90% of the precious metals remain in the residue or solid phase of the pressure oxidized slurry 140. Preferred autoclave operating conditions include a maximum temperature preferably ranging from about 220 to about 230 degrees Celsius.

In step 144, the pressure oxidized slurry 140 is depressurized in a flash vessel to produce an off gas 145 and cooler flashed slurry 146.

In step 148, the flashed slurry 146 is hot cured to convert solid-phase reactive sulfates, particularly insoluble basic ferric sulfate and jarosite, into liquid-phase reactive sulfates, particularly soluble ferric sulfate. Depending on the autoclave conditions and the species present in the autoclave, a number of precipitation reactions commonly occur within the autoclave, producing various iron-sulfate precipitates. These precipitates include hematite, which is preferentially formed at lower temperatures (<200° C.) and lower free acid levels, and basic ferric sulfate, which preferentially forms at higher temperatures and free acid levels. Other precipitates can also form, including scorodite, alunite, and basic aluminium sulfate. Many of the precipitated phases are resistant to cheaper, less aggressive acid consumers, such as limestone, but highly reactive with expensive acid consumers, particularly lime. Lime is used during subsequent neutralization (step 156) due to the high pH required for cyanidation. To minimize lime consumption through this reaction, the slurry 146 is hot cured to dissolve by acid the Basic Ferric Sulfate (BFS) at the lower hot cure temperature (which preferably ranges from about 90 to 95° C.). The soluble ferric sulfate is then washed from the solids during decantation (step 152) prior to neutralization (step 156) and precious metal recovery (e.g., cyanidation) (step 192).

In step 152, the hot cured slurry 150 is separated on the one hand into a liquid phase 153, which proceeds to pre-acidification in step 120, neutralization step 198 (discussed below), or both and on the other into a partially neutralized higher density slurry 162. Separation into the two components may be enhanced by adding suitable flocculants. The decantation circuit preferably includes a number of Counter Current Decantation (CCD) units. Neutralization of the slurry in step 156 is performed using lime, and neutralization of the soluble ferric sulphate in the decantation circuit overflow 153 is performed using, in step 198, flotation tails as discussed below. The higher density slurry 162 preferably has a density ranging from about 30 to about 55 vol. % solids and a pH ranging from about pH 4.5 to about pH 6.5.

In step 156, the slurry 162 is next subjected to neutralization with lime from lime storage 168 to form a neutralized slurry 172 having a pH of at least about pH 6.5 and even more preferably to a pH ranging from about pH 8 to about pH 10. The amount of lime added typically ranges from about 1.0 to about 100 kg/tonne of the solid residue in the slurry 162.

In step 192, the precious metals are recovered from the neutralized slurry 172 to form a precious metal product 194 and waste residue 195. In one process implementation, the precious metal is cyanide leached using a cyanide lixiviant to dissolve precious metals into a pregnant leach solution, leaving a precious metal-barren residue. The dissolved precious metals are adsorbed by a sorbent, such as an organic resin or carbon. Precious metal dissolution and adsorption can be performed simultaneously, or in a common vessel, using a technique, such as Carbon-In-Leach (CIL), Carbon-In-Pulp (CIP) or Resin-In-Leach (RIL). The precious metal is then stripped from the sorbent. This is typically done using a mineral acid (with nitric acid being preferred) to remove calcium ions followed by contact with an eluant in the form of a 1% caustic solution. The barren sorbent can be thermally regenerated and reused. The dissolved precious metal is recovered from the precious metal-loaded eluant using known techniques to form the precious metal product 194 of high purity. The waste residue 195 is subjected to cyanide detoxification, such as by sulfur dioxide/air or contact with Caro's acid.

In step 198, one or both of the overflow 130 from the wash circuit 128 and overflow 184 from the decantation circuit 152 is/are contacted first with heat exchanged flotation tails 165 from the flotation tails thickener 116 and second with lime from lime storage 168, and liquid removed by a wash circuit (not shown) to form neutralized tails 199 for disposal.

The heat exchanged flotation tails 165 include carbonates which effect neutralization according to (but not limited to) the following reactions (using the sulphate reaction with pure CaCO3 as illustrative examples of such carbonate neutralisation reactions):

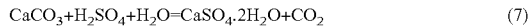

$$CaCO_3+H_2SO_4+H_2O=CaSO_4 \cdot 2H_2O+CO_2 \quad (7)$$

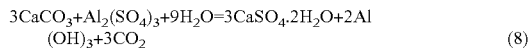

$$3CaCO_3+Al_2(SO_4)_3+9H_2O=3CaSO_4 \cdot 2H_2O+2Al(OH)_3+3CO_2 \quad (8)$$

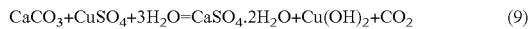

$$CaCO_3+CuSO_4+3H_2O=CaSO_4 \cdot 2H_2O+Cu(OH)_2+CO_2 \quad (9)$$

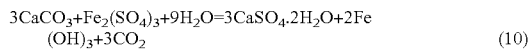

$$3CaCO_3+Fe_2(SO_4)_3+9H_2O=3CaSO_4 \cdot 2H_2O+2Fe(OH)_3+3CO_2 \quad (10)$$

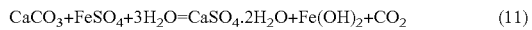

$$CaCO_3+FeSO_4+3H_2O=CaSO_4 \cdot 2H_2O+Fe(OH)_2+CO_2 \quad (11)$$

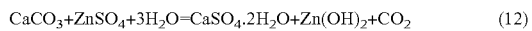

$$CaCO_3+ZnSO_4+3H_2O=CaSO_4 \cdot 2H_2O+Zn(OH)_2+CO_2 \quad (12)$$

Figure 2:
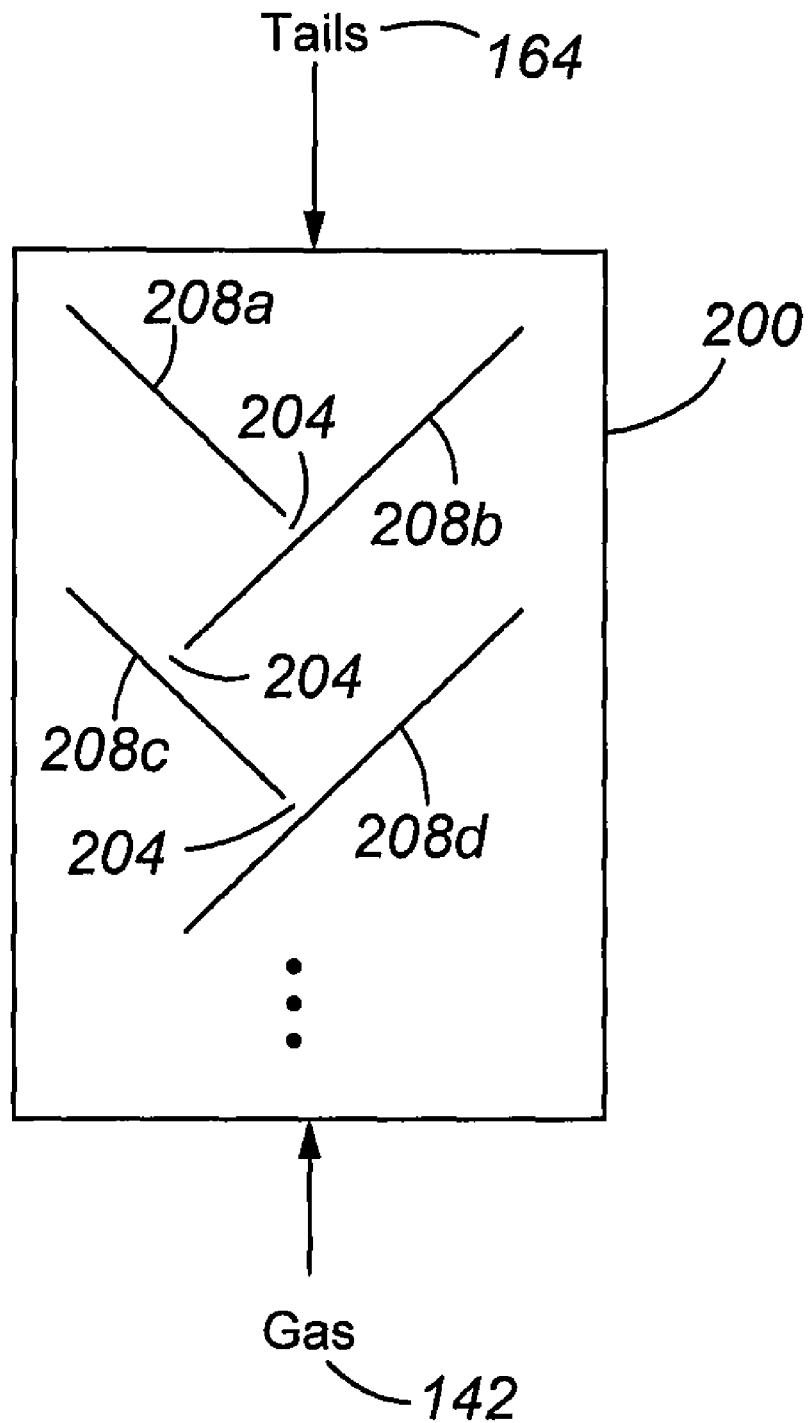
FIG. 2 depicts a heat exchange unit according to an embodiment of the present invention.

It has been discovered that the addition of the relatively high acid consumer (carbonate) content of the thickened flotation tails 164, after contact with the waste gas 142 (which is a combination of off gases 145 and 138), can, surprisingly, decrease limestone and/or lime consumption in neutralization step 198. The waste gas 142 is contacted with the tails 164 in a heat exchange device 200, such as that shown in FIG. 2. The device 200 includes a plurality of downwardly sloping contact plates 208a-d arranged in an inverted chevron pattern, with a flow channel 204 located between the adjacent plates. The gas 142, or steam, is introduced through a gas input at the bottom of the device 200, and the tails 164 (which is in the form of a slurry) through a slurry input at the top of the device 200 so that the fluid streams pass through the device 200 counter currently. The cooled gas is removed from a gas output at the top of the device and the heated tails from a tails output at the bottom of the device. Before contact with the tails, the waste gas 142 has a temperature ranging from about 220 to about 90 degrees Celsius, and the heat exchanged gas 180 a temperature ranging from about 99 to about 20 degrees Celsius. In contrast before contact with the tails, the tails 164 have a temperature ranging from about 5 to about 40 degrees Celsius, and the heat exchanged tails 165 a temperature ranging from about 25 to about 80 degrees Celsius.

The heat exchanged tails 165 (which normally comprise from about 0.1 to about 30 wt. % acid consumers), and possibly additional acid consumers (typically carbonates), are contacted with the overflow 130 from the wash circuit 128 and at least part 188 of the overflow 184 from the decantation circuit 152 in a vessel upstream of lime neutralization. Because of contact with the wash solution in decantation circuit 152, the temperature of the liquid phase of the hot cured concentrate has decreased from a temperature immediately after hot curing typically of at least about 80 degrees Celsius, and more typically from about 85 to about 100 degrees Celsius, to a temperature of no more than about 50 degrees Celsius. Additional temperature reductions in the decantation circuit overflow occur from the contact of the decantation circuit overflow with the overflow from the wash circuit 128. In the vessel in which the heated tails are contacted with the overflow components, the temperature of the overflow components commonly rises to at least about 55 degrees Celsius and even more commonly ranges from about 60 to about 85 degrees Celsius. It is not known whether the more effective reactive sulfate neutralization by the acid consumers in the heat exchanged tails 165 is a result of more favourable reaction kinetics resulting from a higher temperature and/or of thermal activation of the acid consumers in the tails. Preferably, the amount of tails and other acid consumer-containing materials added is sufficient to provide an amount of acid consumers that is at least about 100% of the stoichiometric amount relative to the reactive sulphates in the overflow components being neutralized in step 198. In neutralization step 198, preferably at least about 100% of the reactive sulphates have reacted with acid consumers. Commonly, the use of heat exchanged tails 172 reduces limestone and/or lime consumption in neutralization step 198 by at least about 50% relative to lime consumption from using the tails in the absence of heat exchange with the waste gas.

EXPERIMENTAL

The set of experiments involve the use of heated tailings to neutralize reactive sulfates. The acidic solution was generated from a flotation concentrate during a continuous Pressure Oxidation or "POX" pilot campaign. The concentrate was adjusted to 15 to 20 ppm Cl in the feed solution, and pre-acidified to pH~2 with sulfuric acid prior to the oxidation process. The campaign run was at 225° C. with a 70 min retention time. The discharge slurry was hot cured for about 24 h immediately following the POX process.

For Set 1, 5 kg of the hot cure slurry was filtered, and then the filtrate was diluted with gypsum saturated water to stimulate the counter-current decantation (CCD) conditions. The POX filtrate was diluted at a ratio of 1.6 L gypsum saturated water per litre of POX solution. For Set 2, the hot cure slurry was washed with gypsum saturated water in a CCD at a ratio of 2:1. The overflow acidic filtrate was collected and used for batch and continuous tests. Initially, the pH of the diluted POX solution was approximately pH 1.

The flotation tails used had a carbonate grade of 2.00% $CO_3$.

Limestone was used to compensate for the low pH of the diluted acid solution due to the excess acid addition during the pre-acidification stage of the POX feed. The limestone was from a high purity commercial source, at 98% $CaCO_3$.

Two different types of limes were used. Initially, quicklime (calcium oxide) was used in Set 1; however, its purity was unknown. Hydrated lime (calcium hydroxide) was used for test Set 2. Its purity was 94.7%.

All neutralization tests were performed in stainless steel tanks. Agitation was achieved using variable speed agitators and four-blade axial impellers. Because the tests were performed at high temperatures, glass pH electrodes and automatic temperature compensation pH meter were used. Platinum RTDs were connected to the pH meter to sense the surrounding temperature. The slurry tank was kept at test temperatures with a hot plate connected to a temperature controller. All tests were aerated with air spargers. Flow rates were controlled by rotameters. A stand and clamp were used to securely hold the pH probe, air sparger and RTDs in the tank.

In the lime consumption test setup (where kinetic samples were taken to measure the lime consumption), a sampling syringe was used to collect a 100 mL slurry sample from the test tank. A small beaker was used to contain the slurry sample, and a heating and magnetic stirring combination plate connected to a temperature controller was used to keep it at the test temperature and mixed. The sample was aerated with an air sparger with a rotameter connected to it. Lime was added as slurry to the sample with a 3 mL syringe.

Two sets of tests were performed. The conditions for each test are summarized in Table 1. The details for each test are as follows:

Set 1:
Flotation Tails Reaction Time Test
1. Flotation tails and diluted POX solution were heated separately over night in a hot water bath.
2. pH of the diluted POX solution after heating was recorded.
3. Flotation tails tank was placed on to the hotplate connected to a temperature controller. The slurry was agitated.
4. POX solution was poured into flotation tails slurry tank. Aeration was turned on. This was defined as time zero.
5. pH was recorded continuously with time, by hand and with automatic data-logger.
6. The test was continued for 24 h, with samples removed for lime consumption tests at 4, 6, and 24 h.

Lime Consumption Test
1. 10% lime slurry (by mass) was made with quicklime and water.
2. At 4, 6 and 24 h, 100 mL of slurry sample was taken out of the test tank, placed into a beaker, and mixed with a magnetic stirrer.
3. The current pH was recorded.
4. Lime was added slowly with a syringe to reach pH 7. This was continued until the pH was stable for about one hour.
5. Total volume of lime used and the final pH was recorded.
6. The mass of lime added per litre of POX solution was calculated.

Set 2:
Same procedure as Set 1 except:
Flotation tails and POX solution were heated on separate hotplates connected to temperature controllers on the day of the test, rather than in water baths overnight.
Limestone was added at specific dosage per litre of POX solution.
Hydrated lime at 5% (by mass) was used instead of quickline.
Lime consumption tests were at 4 and 22 h.

TABLE 1

Summary of Test Conditions

| Set | Test | Temp | Vol. Diluted POX (mL) | CaCO3 addition (g/L CCD1) | Mass of CaCO3 to add (g) | FT Pulp Density | FT addition (kg/L CCD1) | Mass FT Solids (g) | Mass FT Slurry (g) | Sample time Time (h) | Lime | Lime % Solids | Lime Res Time (h) |
|---|---|---|---|---|---|---|---|---|---|---|---|---|---|
| Set 1 | 1 | Room temp | 750 | — | — | 0.420 | 0.94 | 707.0 | 1683.3 | 4, 6, 24 | Quicklime | 10 | 1 |
|  | 1B | Room temp | 560 | — | — | 0.420 | 1.28 | 715.7 | 1704.0 | 4, 6, 25 | Quicklime | 10 | 1 |
|  | 3 | 60° C. | 560 | — | — | 0.420 | 1.28 | 715.7 | 1704.0 | 4, 21, 26 | Quicklime | 10 |  |
|  | 4 | 80° C. | 750 | — | — | 0.420 | 0.94 | 707.0 | 1683.3 | 4, 6, 27 | Quicklime | 10 |  |
|  | 5 | Room temp | 750 | — | — | 0.420 | 0.94 | 707.0 | 1683.3 | 4, 6, 28 | Quicklime | 10 |  |
| Set 2 | 6 | 80° C. | 600 | 12.6 | 7.56 | 0.429 | 1.30 | 780.0 | 1818.2 | 4, 22 | Hydrated lime | 5 |  |
|  | 7 | 70° C. | 600 | 12.6 | 7.56 | 0.429 | 1.30 | 780.0 | 1818.2 | 4, 22 | Hydrated lime | 5 |  |
|  | 8 | 60° C. | 600 | 12.6 | 7.56 | 0.429 | 1.30 | 780.0 | 1818.2 | 4, 22 | Hydrated lime | 5 |  |
|  | 9 | Room temp | 600 | 12.6 | 7.56 | 0.429 | 1.30 | 780.0 | 1818.2 | 4, 22 | Hydrated lime | 5 | 1 |
| Baseline Lime Test | 16 | 70° C. | 500 | 8.3 | 4.15 | — | — | — | — | — | Hydrated lime | 5 | — |
|  | 16B | 70° C. | 500 | 8.3 | 4.15 | — | — | — | — | — | Hydrated lime | 5 | — |

Table 1 summarizes the conditions in each set of test performed. The following sections will discuss the results in each of the sets.

The purpose of the first set of tests was to determine the effect of temperature and staged flotation tails addition. It was postulated that stage addition could increase utilization of the neutralizing potential of the flotation tails. Five tests were performed at room temperature, 60° C., and 80° C., with flotation tailings addition at 0.94 to 1.28 kg per litre of diluted POX solution. Refer to Table 1 for further details. All high temperature tests were heated overnight in a hot water bath. For the lime consumption tests, three 100 mL samples were taken at 4, 6, and 24 h.

The staged flotation tails addition was performed at room temperature. Flotation tails were slowly added to the diluted acid solution until pH 2 was reached. The pH of the slurry was monitored for two hours before adding the rest of the flotation tails.

There were a few problems encountered for the first set of tests:
- The pulp density of the flotation tails was much lower than intended. Some tests only used 74% of the intended amount of flotation tails.
- Slow reactions and precipitation may have occurred in the flotation tails and the diluted POX solution during the overnight heating. This could have decreased the neutralizing effect of the flotation tails.
- Heating for the lime consumption test was difficult to control. The 4 h lime consumption test at 80° C. (Test 4) had severe evaporation and drying. Therefore, the other lime consumption tests were not heated.

Figure 3:
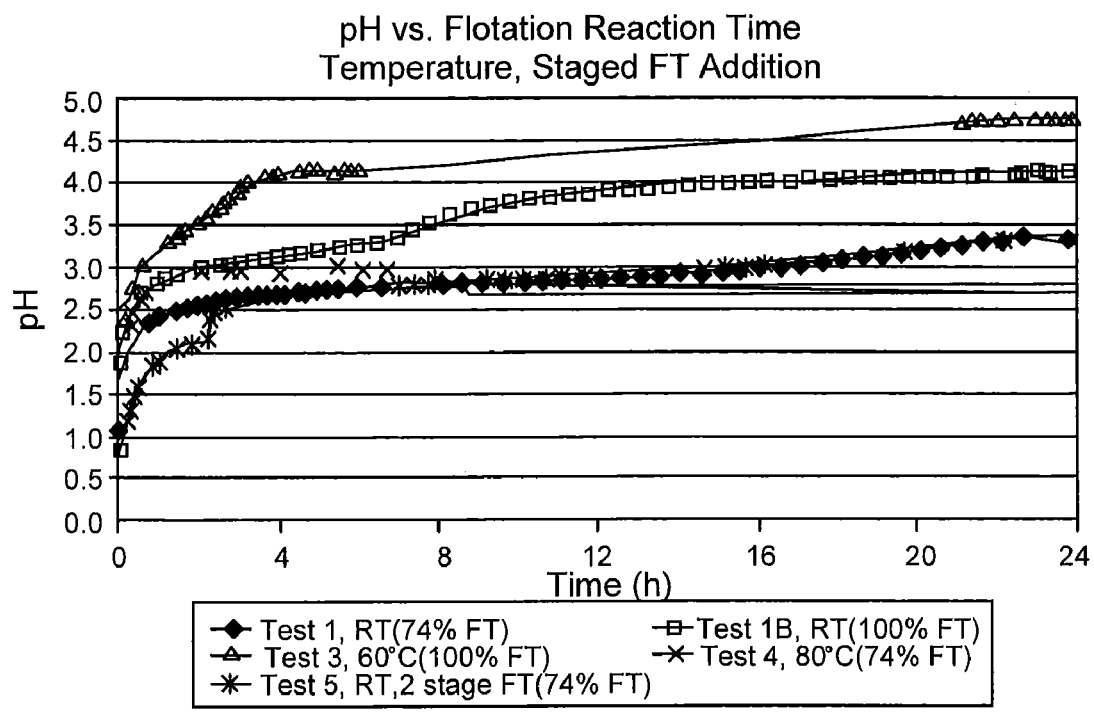
FIG. 3 is a plot of pH (vertical axis) against time (horizontal axis) (hours)
Figure 4:
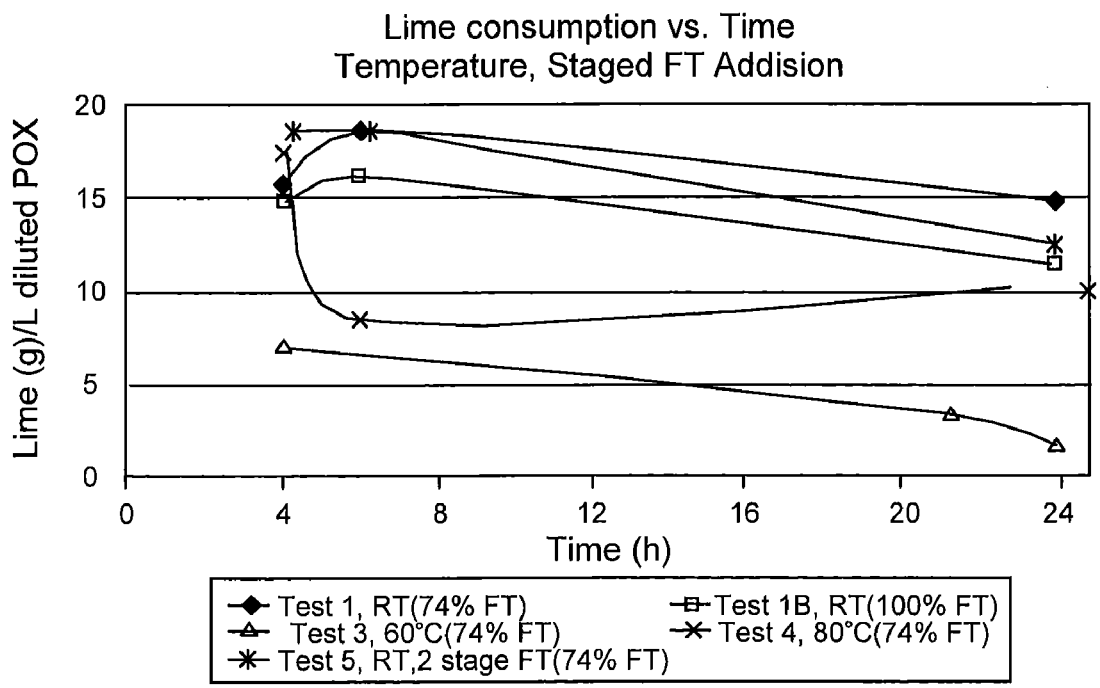
FIG. 4 is a plot of lime (grams)/L diluted POX (vertical axis) against time (horizontal axis) (hours)
Figure 5:
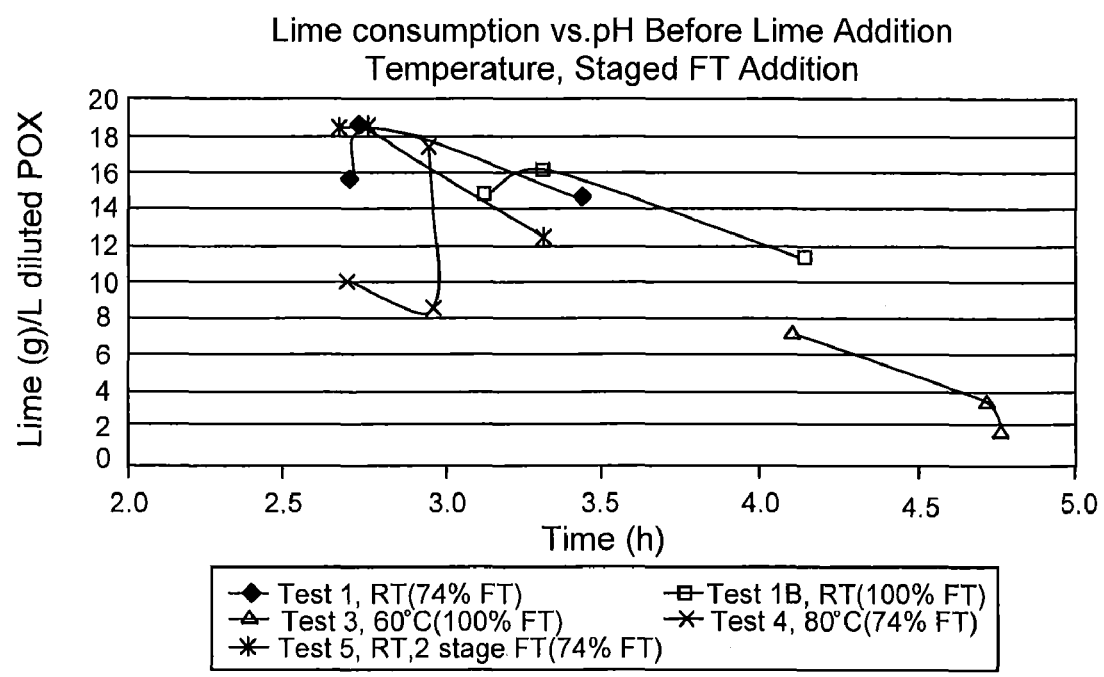
FIG. 5 is a plot of lime (grams)/L diluted POX (vertical axis) against pH (horizontal axis) (hours)

FIGS. 3 to 5 show the pH profiles and lime consumptions at the different test temperatures. When comparing the room temperature test at 74% flotation tails (Test 1) and the staged flotation tails addition (Test 5), the trend of the two pH profiles after the first 4 h and lime consumption were quite similar. There was no significant improvement by performing a staged addition. Therefore, no further investigation of this condition was pursued.

However, when heating was involved, there was a substantial improvement. The final pH of room temperature (Test 1B) was at 4.15, whereas for 60° C. (Test 3) was at 4.76. What was most noteworthy was that there was a significant difference in lime consumption. At room temperature, the final lime consumption at 24 h (Test 1B) was 11.28 g of lime per litre of POX slurry, which increased the pH from pH 4.14 to pH 7.16. This was almost ten times the amount of final lime consumption for the 60° C. test (Test 3), which used 1.16 g of lime per litre of POX slurry, increasing the pH from 4.76 to 7.48. Test 4 at 80° C. did not exhibit the expected pH increase on flotation tails addition. It is not clear whether experimental problems of iron hydrolysis were responsible for this unexpected behavior.

Like the previous set, the aim in Set 2 was to determine the effect of temperature. However, in this case, limestone ($CaCO_3$) was combined with the diluted POX solution to increase the pH to compensate for the low pH due to the pre-acidification treatment during pressure oxidation feed preparation process. The four tests were performed at 1.3 kg of flotation tailings per litre of diluted POX solution. Unlike the previous test, the diluted POX solution was from the CCD overflow, with 2:1 gypsum saturated wash ratio. Refer to Table 4 for conditions details. These tests were performed at room temperature, 60, 70 and 80° C. with 12.6 g of limestone added per litre of diluted POX solution. The samples were first separately heated on hotplates connected to temperature controllers. The flotation tails were left to react for 22 h, with 100 mL lime consumption tests at 4 and 22 h.

In contrast to Set 1, the slurry samples were heated to the test temperature for lime consumption tests, using a heating and magnetic stirring combination plate connected to a temperature controller. This gave a better control of the temperature to prevent extreme evaporation, and drying of the small sample. In addition, 5% hydrated lime was used rather than 10% quicklime used in the previous test.

One problem that occurred was that the temperature for Test 8 at 60° C. dropped to 12.5° C. overnight. The tank was reheated the next morning to 60° C. at 21 h reaction time for the rest of the test.

Figure 6:
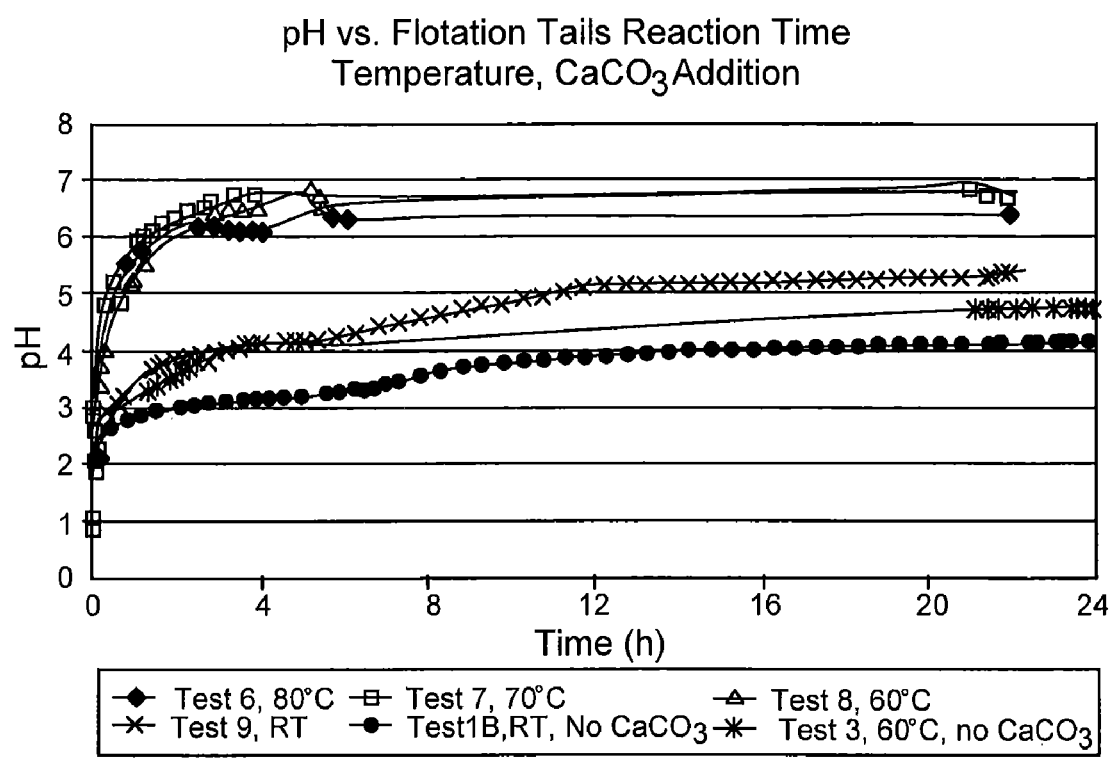
FIG. 6 is a plot of pH (vertical axis) against time (horizontal axis) (hours)
Figure 7:
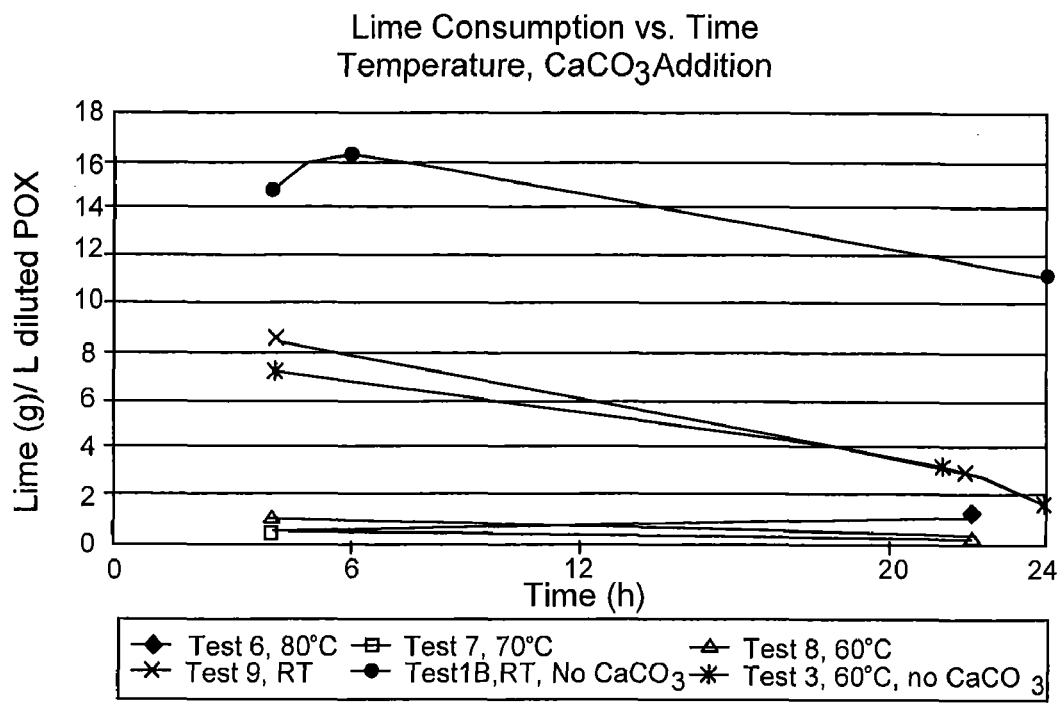
FIG. 7 is a plot of lime (grams)/L diluted POX (vertical axis) against time (horizontal axis) (hours)

The final pH of the flotation tails reaction time tests were much higher when limestone was added. In addition, the lime consumption decreased. FIGS. 5 to 7 show the contrast between set one (no limestone addition) and set two results (with limestone addition).

Figure 8:
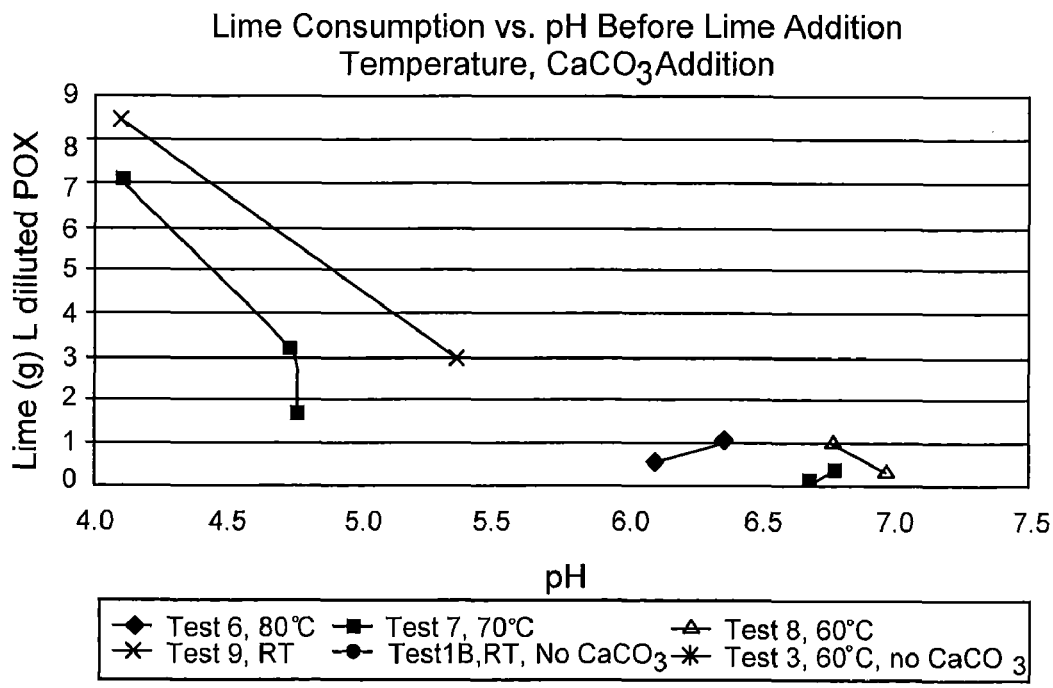
FIG. 8 is a plot of lime (grams)/L diluted POX (vertical axis) against pH (horizontal axis).

FIGS. 6 to 8 show the pH profiles and lime consumptions of the four tests as well as comparative tests from Set 1 where no limestone was added. As indicated by the Figs., there is a large gap between the heated and room temperature tests, confirming the advantage of performing the tests at higher temperatures.

By observing the three Figs., Test 7 at 70° C. had the best results. Although Test 8 at 60° C. had the highest pH at the end of the flotation tails reaction time test, Test 7 had the lowest lime consumption, denoting a reduction in lime costs. At 22 h, the pH of the flotation tails reaction time test was at 6.67 with lime consumption of 0.16 g of lime per litre of POX slurry to bring up the pH to pH 7.00. The lime consumption for Test 8 at 60° C. was twice as high.

Tests 6 at 80° C. however, experienced a different trend. As the test progressed, the pH of the flotation tails reaction time test was lower than the 60° C. and the 70° C. tests. The 80° C. test in Set 1 experienced a similar trend. Furthermore, both tests consumed more lime in the final lime consumption test than its previous lime test. One possibility for this is that more precipitation onto the flotation tails may have occurred due to the higher temperature. Therefore the neutralizing power of the flotation tails may have decreased.

The objective of these batch tests was to investigate the flotation tails reaction time and lime consumption at certain times under different conditions. Two percent carbonate grade flotation tails (as $CO_3$) was first used to partially neutralize the diluted POX solution for a specified residence time, then lime was added to ensure target pH of 7 was reached. Tests were conducted to determine the effect of temperature, limestone addition, and flotation tailings addition on the pH and lime consumption profiles.

Set 1 was a preliminary examination of the effect of staged flotation tails addition and different temperatures. The staged flotation tails addition did not demonstrate any significant improvement in comparison to single stage flotation tails addition. Therefore, this condition was not further pursued. There were substantial improvements in terms of pH profile and lime consumption when increased temperature was involved.

Additional investigation of the effect of temperature was done in Set 2; however, in contrast to Set 1, limestone was added. This was done to compensate for the low pH of the diluted POX solution due to the pre-acidification process during the POX feed preparation. The heated tests were superior to room temperature. The test at 70° C. had the best result, achieving the highest pH with lowest lime consumption.

In short, these batch tests confirmed that operating at higher temperatures and adding limestone prior to flotation tails addition generate improved results, requiring less time to reach target pH. Later pilot testing campaigns confirmed the consistency of this result, by indicating that the same result can be achieved under continuous operating conditions, rather than simply batch operating conditions.

A number of variations and modifications of the invention can be used. It would be possible to provide for some features of the invention without providing others.

By way of example, flotation may be reverse, rather than direct. In reverse flotation, the carbon-containing material is activated and floated in the concentrate while the sulfide minerals are depressed and recovered in the tails.

In yet another embodiment, heated flotation tails (or natural carbonates) alone can effect neutralization of autoclave acidic liquor to pH 6.5 to pH 7 (see FIG. 6). Potentially no lime addition is then required, if this target pH is satisfactory for the application. To realize this surprising result, the ratio of flotation tails addition to the acid solution must be sufficiently high, and the residence time of the neutralization process of sufficiently length. Accordingly, it is not always necessary to use manufactured lime to precipitate all of the ferric and ferrous sulfates. Under proper conditions with suitable natural carbonates, when heated, substantially all of the ferric and ferrous sulfates can be precipitated.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) providing a precious metal-bearing material, the precious metal-bearing material comprising acid consumers;
   (b) floating the material to form a first fraction comprising at least most of the precious metal in the precious metal-bearing material and a second fraction comprising at least some of the acid consumers in the precious metal-bearing material;
   (c) pressure oxidizing at least portions of the first fraction but not the second fraction to form a pressure oxidized slurry comprising pressure oxidized residue and reactive sulfates and an off gas, wherein the pressure oxidized residue comprises at least most of the precious metal in the preciuos metal-bearing material;
   (d) contacting the off gas with at least a portion of the second fraction to cool the off gas and heat the at least a portion of the second fraction;
   (e) contacting the heated at least a portion of the second fraction with at least a portion of the pressure oxidized slurry to neutralize, at least partially, reactive sulfates in the at least a portion of the pressure oxidized slurry;
   (f) contacting the pressure oxidized residue with an alkaline lixiviant to dissolve at least most of a selected precious metal in a pregnant leach solution; and
   (g) thereafter recovering the dissolved selected precious metal from the pregnant leach solution.

2. The method of claim 1, wherein the selected precious metal is at least one of gold and silver and wherein step (e) comprises the sub-steps:
   (e1) first contacting the pressure oxidized slurry with a wash solution in one or more first decantation units to form a dilute slurry and an overflow component, the overflow component having a temperature less than a temperature of the pressure oxidized slurry;
   (e2) second contacting the heated at least a portion of the second fraction with at least a portion of the overflow component to neutralize at least partially reactive sulfates in the overflow component; and
   (e3) thereafter contacting the overflow component with lime to consume reactive sulfates remaining from step (e2) to form the neutralized overflow component.

3. The method of claim 2, wherein an amount of lime required to yield a selected pH in the absence of heating the at least a portion of the second fraction is greater than an amount of limestone and/or lime required to yield the selected pH when the at least a portion of the second fraction is heated.

4. The method of claim 2, wherein an amount of limestone and/or lime required to consume the reactive sulfates when the second fraction is contacted with the off gas is no more than about 50% of an amount of lime required to consume the reactive sulfates when the second fraction is not contacted with the off-gas.

5. The method of claim 1, wherein the feed material comprises from about 0.1 to about 30 wt. % inorganic carbon and from about 0.3 to about 10 wt. % organic carbonaceous material.

6. The method of claim 1, wherein the at least a portion of the slurry is a liquid component and further comprising:
   hot curing the pressure oxidized slurry, following pressure oxidation, to convert substantially solid-phase reactive sulfates into liquid-phase reactive sulfates; and
   separating the hot cured slurry into a solid component and the liquid component, the solid component comprising the pressure oxidized residue and the liquid phase comprising the liquid-phase reactive sulfates.

7. The method of claim 1, wherein the first fraction is a concentrate and the second fraction is tails, wherein the heated at least a portion of the flotation tails has a temperature ranging from about 25 to about 80 degrees Celsius, wherein the at least a portion of the pressure oxidized slurry, immediately prior to step (e) has a temperature of no more than about 50 degrees Celsius, and wherein, during contacting step (e), the pressure oxidized slurry is heated, by the flotation tails, to a temperature of at least about 55 degrees Celsius.

8. The method of claim 1, wherein the second fraction comprises at least most of the acid consumers in the feed material.

9. The method of claim 1, wherein the precious metal is at least one of gold and silver and wherein an amount of lime required to consume the reactive sulfates when the tails are contacted with the off gas is no more than about 50% of an amount of lime required to consume the reactive sulfates when the tails are not contacted with the off-gas.

10. A method, comprising:
(a) providing a precious metal-bearing material, the precious metal-bearing material comprising acid consumers;
(b) floating the precious metal-bearing material to form a concentrate comprising at least most of the precious metal in the precious metal-bearing material and tailings comprising at least most of the acid consumers in the precious metal-bearing material;
(c) pressure oxidizing a slurry comprising the concentrate to form a pressure oxidized slurry, the pressure oxidized slurry comprising pressure oxidized residue and reactive sulfates and an off gas, wherein the pressure oxidized residue comprises at least most of the precious metal in the precious metal-bearing material;
(d) thereafter hot curing the pressure oxidized slurry to convert solid-phase reactive sulfates into liquid-phase reactive sulfates;
(e) separating the hot cured slurry into a solid component and a liquid component, the solid component comprising the pressure oxidized residue and the liquid component comprising the liquid-phase sulfates;
(f) contacting the off gas with at least a portion of the tailings and not the concentrate to cool the off gas and heat the at least a portion of the tailings;
(g) contacting the heated at least a portion of the tailings with the liquid component of the hot cured slurry to neutralize, at least partially, liquid-phase reactive sulfates; and
(h) thereafter recovering the precious metal from the solid component of the hot cured slurry.

11. The method of claim 10, wherein the precious metal is at least one of gold and silver and wherein the feed material comprises from about 0.1 to about 30 wt. % inorganic carbon and from about 0.3 to about 10 wt. % organic carbonaceous material.

12. The method of claim 10, wherein the heated at least a portion of the flotation tails has a temperature ranging from about 25 to about 80 degrees Celsius, wherein the at least a portion of the pressure oxidized slurry, immediately prior to step (h) has a temperature of no more than about 50 degrees Celsius, and wherein, during contacting step (h), the pressure oxidized slurry is heated, by the flotation tails, to a temperature of at least about 55 degrees Celsius.

13. The method of claim 10, wherein an amount of lime required to consume the reactive sulfates when the tails are contacted with the off gas is no more than about 50% of an amount of limestone and/or lime required to consume the reactive sulfates when the tails are not contacted with the off-gas.

14. A method, comprising:
(a) floating a precious metal-bearing material, the precious metal-bearing material comprising acid consumers, to form a concentrate comprising at least some of the precious metal in the precious metal-bearing material and tailings comprising at least some of the acid consumers in the precious metal-bearing material;
(b) contacting the concentrate with an acid-containing wash solution to consume, at least partially, acid consumers in the concentrate and form a pre-treated slurry comprising the concentrate;
(c) washing the pre-treated slurry to form a washed slurry and a liquid overflow, the liquid overflow comprising acid;
(d) pressure oxidizing the pre-treated slurry to form a pressure oxidized slurry, the pressure oxidized slurry comprising a pressure oxidized concentrate and reactive sulfates and an off gas, wherein the pressure oxidized concentrate comprises at least most of the precious metal in the precious metal-bearing material;
(e) separating the pressure oxidized slurry into a solid component and a liquid component, the solid component comprising the pressure oxidized residue and the liquid component comprising the liquid-phase sulfates;
(f) contacting the off gas with at least a portion of the tailings and not the concentrate to cool the off gas and heat the at least a portion of the tailings;
(g) contacting the heated at least a portion of the tailings with at least one of the liquid component of the pressure oxidized slurry and liquid overflow to neutralize, at least partially, liquid-phase reactive sulfates; and
(h) thereafter recovering the precious metal from the solid component of the pressure oxidized slurry.

15. The method of claim 14 wherein the feed material comprises from about 0.1 to about 30 wt. % inorganic carbon and from about 0.3 to about 10 wt. % organic carbonaceous material.

16. The method of claim 14, wherein the heated at least a portion of the flotation tails has a temperature ranging from about 25 to about 80 degrees Celsius, wherein the at least a portion of the pressure oxidized slurry, immediately prior to step (h) has a temperature of no more than about 50 degrees Celsius, and wherein, during contacting step (h), the pressure oxidized slurry is heated, by the flotation tails, to a temperature of at least about 55 degrees Celsius.

17. The method of claim 14, wherein the tails comprise most of the acid consumers in the feed material.

18. The method of claim 14, further comprising after step (d) and before step (e):
hot curing the pressure oxidized slurry to convert substantially solid-phase reactive sulfates into liquid-phase reactive sulfates.

19. A method, comprising:
(a) providing a refractory precious metal-bearing sulfidic material;
(b) providing a slurry stream comprising acid consumers;
(c) oxidizing the refractory precious metal-bearing sulfidic material to form an oxidized slurry comprising oxidized residue and reactive sulfates and waste heat, wherein the pressure oxidized residue comprises at least most of the precious metal in the preciuos metal-bearing material;
(d) contacting the slurry stream with the waste heat to heat the slurry stream and not the refractory sulfidic precious metal-bearing material; and (e) contacting the heated slurry stream with the liquor component of the oxidized slurry to neutralize, at least partially, reactive sulfates in the oxidized slurry;
(f) thereafter contacting the oxidized residue with an alkaline lixiviant to dissolve at least most of a selected precious metal in a pregnant leach solution; and
(g) thereafter recovering the selected precious metal from the pregnant leach solution.

20. The method of claim 19, wherein the slurry stream comprises flotation tails, wherein the oxidizing step is pressure oxidation, wherein the waste heat is in an off-gas from pressure oxidation, and wherein, in the contacting step (d), the slurry stream is contacted physically with the off-gas.

\* \* \* \* \*